United States Patent
Achten et al.

(10) Patent No.: US 12,331,227 B2
(45) Date of Patent: Jun. 17, 2025

(54) SOLVENT-BORNE POLYURETHANE ADHESIVES WITH HIGH MOLECULAR WEIGHT, HIGH OH CONTENT AND LOW SOLUTION VISCOSITY

(71) Applicant: Covestro Deutschland AG, Leverkusen (DE)

(72) Inventors: Dirk Achten, Leverkusen (DE); Fabian Schuster, Leverkusen (DE); Ann-Christin Bijlard-Jung, Rösrath (DE); Joerg Tillack, Solingen (DE)

(73) Assignee: Covestro Deutschland AG, Leverkusen (DE)

( * ) Notice: Subject to any disclaimer, the term of this patent is extended or adjusted under 35 U.S.C. 154(b) by 111 days.

(21) Appl. No.: 18/246,703

(22) PCT Filed: Sep. 21, 2021

(86) PCT No.: PCT/EP2021/075843
§ 371 (c)(1),
(2) Date: Mar. 27, 2023

(87) PCT Pub. No.: WO2022/063731
PCT Pub. Date: Mar. 31, 2022

(65) Prior Publication Data
US 2023/0407152 A1    Dec. 21, 2023

(30) Foreign Application Priority Data
Sep. 28, 2020  (EP) ...................... 20198814

(51) Int. Cl.
| | |
|---|---|
| C09J 175/06 | (2006.01) |
| C08G 18/08 | (2006.01) |
| C08G 18/32 | (2006.01) |
| C08G 18/42 | (2006.01) |
| C08G 18/66 | (2006.01) |
| C08G 18/72 | (2006.01) |
| C08G 18/73 | (2006.01) |
| C08G 18/75 | (2006.01) |
| C08K 5/5398 | (2006.01) |
| C09J 5/00 | (2006.01) |
| C09J 11/06 | (2006.01) |
| C09J 175/02 | (2006.01) |

(52) U.S. Cl.
CPC ......... *C09J 175/06* (2013.01); *C08G 18/0857* (2013.01); *C08G 18/3206* (2013.01); *C08G 18/42* (2013.01); *C08G 18/664* (2013.01); *C08G 18/722* (2013.01); *C08G 18/73* (2013.01); *C08G 18/755* (2013.01); *C08K 5/5398* (2013.01); *C09J 5/00* (2013.01); *C09J 11/06* (2013.01); *C09J 175/02* (2013.01); *C09J 2475/00* (2013.01)

(58) Field of Classification Search
CPC ............ C09J 175/06; C09J 5/00; C09J 11/06; C09J 2475/00; C09J 175/02; C08G 18/3206; C08G 18/42; C08G 18/664; C08G 18/722; C08G 18/73; C08G 18/755; C08G 18/0857; C08K 5/5398
See application file for complete search history.

(56) References Cited

U.S. PATENT DOCUMENTS 3,928,271 A   12/1975  Matsuda et al.

FOREIGN PATENT DOCUMENTS

| CN | 109957370 A | 7/2019 |
| EP | 0024864 A1 | 3/1981 |
| GB | 1527596 | 10/1978 |

*Primary Examiner* — Rabon A Sergent
(74) *Attorney, Agent, or Firm* — The Webb Law Firm

(57) ABSTRACT

An adhesive composition includes a polyurethane polymer, a solvent and a co-solvent. The polyurethane polymer is an internally and/or externally hydrophilized thermoplastic polyurethane having an Mw of ≥50000 g/mol. The solvent is a polar-aprotic solvent. The co-solvent is selected from water, a primary alcohol having ≤10 carbon atoms, a vicinal diol or a mixture of at least two of the aforementioned compounds. The solvent and the co-solvent are present in such amounts that they form a homogenous mixture without the formation of a second phase when combined together at 20° C. The hydroxyl group content is ≥1 weight-%, based on the total weight of the composition. The polyurethane polymer content is ≥10 weight-%, based on the total weight of the composition and the composition forms a single continuous liquid phase. Examples for solvent/co-solvent combinations are methylethyl ketone (MEK) and water or MEK and ethanol.

13 Claims, No Drawings

SOLVENT-BORNE POLYURETHANE ADHESIVES WITH HIGH MOLECULAR WEIGHT, HIGH OH CONTENT AND LOW SOLUTION VISCOSITY

CROSS-REFERENCE TO RELATED APPLICATIONS

This application is the United States national phase of International Application No. PCT/EP2021/075843 filed Sep. 21, 2021, and claims priority to European Patent Application No. 20198814.4 filed Sep. 28, 2020, the disclosures of which are hereby incorporated by reference in their entireties.

BACKGROUND OF THE INVENTION

Field of the Invention

The present invention relates to an adhesive composition comprising a polyurethane polymer, a solvent and a co-solvent. The invention further relates to a method of manufacturing an adhesive composition, a method of adhering two surfaces and to the use of a mixture of a solvent and a co-solvent for dissolving a thermoplastic polyurethane polymer.

Description of Related Art

High molecular weight contact- and/or heat activated solvent-borne polyurethane adhesives and solvent-borne coatings are still widely in use in the DIY, footwear, wood, textile, construction and automotive sector. Their main advantage is their good compatibility with a wide range of substrates. Polyurethane solvent-borne adhesives are typically applied evenly onto both substrates which are to be bonded. A main feature of these adhesive is their ability to provide high initial bond strengths directly after contacting the substrates under pressure. They are further known for their good mechanical properties such as high tensile strength and elongation as well as their elasticity and tough bond lines.

The polyurethane polymers which serve as a basis for high molecular weight solvent-borne polyurethane adhesives are mainly produced using a solution polymerization process. The most common solvent for this process is still toluene, which is difficult to extract entirely from the polyurethane polymer typically supplied as a dry pellet. Therefore, solvent formulations of these high molecular weight polymers often still employ toluene as a co-solvent. Since the solubility of such materials in common solvents at ambient temperatures of e.g. 20° C. is rather low, typically solid contents of only 10-15 weight % of polymer can be achieved.

Similarly, polyurethane polymers for high molecular weight solvent-borne coatings are typically produced in solvents as well. Common fields of use for these coatings are wood and textile coatings.

Other solvent systems for polyurethanes can be based on ketones such as acetone or methylethyl ketone (MEK). Mixed solvent systems can include MEK and an alcohol. In combination with thickening agents adhesive formulations which are highly viscous or solid at room temperature are described in the prior art.

GB 1527596 A discloses a method of thickening a solution of a film-forming polymer material in a solvent of dielectric constant in the range of 5.0 to 50.0, comprising mixing with said solution at a temperature above room temperature, an alkali metal salt of a $C_{8-36}$ fatty acid and allowing the mixture to cool without substantial agitation. One example discloses a composition with the ingredients: 20 weight-% of a linear linked polyurethane, 10 weight-% of the alkylphenol resin Alresen PA104, 40 weight-% of methylethyl ketone, 29.7 weight-% of ethanol and 0.3 weight-% of sodium stearate. The procedure is described in the following quote: "Fill the methylethyl ketone into a vessel fitted with a reflux condenser; add the linear linked polyurethane with stirring. After about 2.5 hours when the solution seems to be homogenous add the alkylphenyl resin and continue stirring for ½ hour. Then add the hot solution (20° C.) of sodium stearate in ethanol slowly under stirring and heat the whole mixture to about 60° C. After reaching a fully homogenous mixture allow the resultant mix to cool".

EP 0024864 A1 relates to a synthetic-rubber-based solvent adhesive for use in glue-sticks where the adhesive comprises a solution of: (a) a linear branched-chain polyurethane rubber, (b) a carboxylated butadiene-acrylonitrile rubber, containing at least 50% butadiene by weight, and (c) the reaction product of sorbitol and benzaldehyde in a non-aqueous solvent system. The solvent system may comprise at least-one polar solvent selected from iso-butanol, diacetone alcohol and 2-methoxyethanol and a second solvent selected from methylethyl ketone, ethyl acetone and toluene.

SUMMARY OF THE INVENTION

The present invention has the object of providing a toluene-free, clear polyurethane solvent-based adhesive composition which does not have a high viscosity, can be applied via brushing methods and with a solids content which is comparable to or higher than the solids contents of toluene-based polyurethane adhesive formulations.

This object is achieved by an adhesive composition as described herein. A method of manufacturing an adhesive composition and a method of adhering two surfaces are described herein. The use of a mixture of a solvent and a co-solvent for dissolving a thermoplastic polyurethane polymer are also described herein. Advantageous embodiments are the subject of the dependent claims. They may be combined freely unless the context clearly indicates otherwise.

DETAILED DESCRIPTION

Accordingly, an adhesive composition comprising a polyurethane polymer, a solvent and a co-solvent is provided wherein the polyurethane polymer is an internally and/or externally hydrophilized thermoplastic polyurethane having a mass average molecular weight Mw, as determined by gel permeation chromatography against polystyrene standards using N,N-dimethyl acetamide as the eluent, of ≥50000 g/mol (preferably ≥50000 g/mol to ≤350000 g/mol), the solvent is a polar-aprotic solvent, the co-solvent is selected from water, a primary alcohol having ≤10 carbon atoms, a vicinal diol or a mixture of at least two of the aforementioned compounds, the solvent and the co-solvent are present in such amounts that they form a homogenous mixture without the formation of a second phase when combined together at 20° C., the hydroxyl group content is ≥1 weight-%, based on the total weight of the composition and the polyurethane polymer content is ≥10 weight-%, based on the total weight of the composition. The composition forms a single continuous liquid phase. The formation of a single continuous liquid phase can be determined by observing a clear composition upon visual inspection.

The polyurethane polymer preferably comprises structural units derived from an aliphatic diisocyanate and/or structural units derived from a polyester diol. Linear polyester polyurethanes may be produced produced by reaction of a) polyester diols having a molecular weight above 600 g/mol and optionally b) diols in the molecular weight range of 62 to 600 g/mol as chain extenders with c) aliphatic diisocyanates, while observing an equivalent ratio of hydroxyl groups of components a) and b) to isocyanate groups of component c) of 1:0.9 to 1:0.999, wherein component a) consists to an extent of at least 80% by weight of polyester diols in the molecular weight range of 1500 to 3000 based on (i) adipic acid and (ii) 1,4-dihydroxybutane and/or neopentyl glycol.

It is further preferred that component c) comprises isophorone diisocyanate and also hexamethylene diisocyanate. It is also preferred that the alkanediols b) are selected from the group consisting of: 1,2-dihydroxyethane, 1,3-dihydroxypropane, 1,4-dihydroxybutane, 1,5-dihydroxypentane, 1,6-dihydroxyhexane or a combination of at least two of these in an amount of up to 200 hydroxyl equivalent percent based on component a).

The polyurethanes may also comprise urea groups and therefore also be regarded as polyurethane/polyurea compounds.

The polyurethanes may be of the crystallizing type, i.e. they at least partially crystallize after drying of the dispersion. The crystallizing temperature of the polyurethane material, as determined by DSC at a cooling rate of 20 K/min may be 20° C. or greater, preferably 40° C. or greater.

Examples for suitable polar-aprotic solvents include ketones such as methylethyl ketone or acetone, ethers such as tetrahydrofurane, carbonates such as dimethyl carbonate and esters such as ethyl acetate.

Examples for suitable co-solvents include water, methanol, ethanol, 1-propanol, 1-butanol, 1-pentanol, 1-hexanol, glycol, 1,3-propane diol, 1,4-butane diol, 1,4-butene diol, 1,4-butine diol, 1.5 pentane diol, glycerol, 1,2-propane diol, 2,3-butane diol, trimethylol propane, and etherdiols of ethylene oxide and propylene oxide with a molecular weight of ≤250 g/mol.

Internally hydrophilized thermoplastic polyurethanes are understood to be those thermoplastic polyurethanes which comprise, via a chemical bond, ionic groups and/or non-ionic hydrophilic groups.

The ionic groups may be either cationic or anionic in nature. Compounds that act as cationic, anionic or non-ionic hydrophilizers include those which comprise, for example, sulphonium, ammonium, phosphonium, carboxylate, sulphonate or phosphonate groups or groups which can be converted by salt formation to the aforementioned groups (potentially ionic groups) or polyether groups, and for example can be incorporated into the polyurethanes via isocyanate-reactive groups present.

The neutralizing agents required for salt formation may be added to the salt-forming groups either in a stoichiometric ratio or in excess. To generate anionic groups, organic bases such as tertiary amines or inorganic bases such as alkali metal hydroxides or ammonia are added. In this case, preference is given to using tertiary amines such as triethyl amine, triethanol amine or dimethylethanol amine Preferred suitable isocyanate-reactive groups are hydroxyl and amine groups.

Preferred non-ionic hydrophilizers are polyoxyalkylene ethers containing at least one hydroxyl or amino group.

These polyethers may contain a proportion of 30% by weight to 100% by weight of units derived from ethylene oxide.

Externally hydrophilized thermoplastic polyurethanes are understood to be thermoplastic polyurethanes which have been combined with emulsifiers. Both ionic emulsifiers such as alkali metal and ammonium salts of fatty acids or of aryl(alkyl) sulphonic acids and non-ionic emulsifiers, for example ethoxylated alkyl benzenes with an average molecular weight of 500 g/mol to 10000 g/mol are suitable. Other examples for suitable emulsifiers are AB and ABA block copolymers of poly(ethylene oxide) and poly(butyl acrylate) or polyethers that have been started on lauryl alcohol.

It is within the scope of the present invention that the emulsifiers migrate from the thermoplastic polyurethane material into the combined liquid phase of solvent and co-solvent.

Combinations of an internally hydrophilized thermoplastic polyurethane and external emulsifiers are also possible.

In the composition according to the invention it is provided that the solvent and the co-solvent are present in such amounts that they form a homogenous mixture without the formation of a second phase when combined together at 20° C. This can easily be accomplished by referring to miscibility data for the respective binary system or by a series of simple experiments. For example, literature data indicates a homogenous mixture of MEK and water at 20° C. with 11% (mass/mass) of water in MEK. The absence of a second phase is beneficial in storing and applying the adhesive composition.

In the composition according to the invention the hydroxyl group content is ≥1 weight-%, based on the total weight of the composition. This can be determined by titration according to DIN 53420-1. Total OH contents, expressed as weight-percentages, can also be calculated from the recipe of the formulation as follows:

$$\% \text{ OH of protic co solvent} = \frac{f * M_{OH}}{M_{protic\ co\ solvent}} * 100$$

Where: f=number of OH groups per molecule, $M_{OH}$=molar mass of OH (17 g/mol), $M_{protic\ co\ solvent}$=molar mass of protic co solvent (g/mol).

The calculated total OH content [%] of the total formulation equals to:

calculated OH content [%] =

$$\frac{\% \text{ OH of protic co solvent} * \text{mass of protic co solvent}}{\text{total mass}}$$

In the composition according to the invention the polyurethane polymer content is ≥10 weight-%, based on the total weight of the composition. Preferred is a content of ≥10 weight-% to ≤50 weight-% and more preferred ≥15 weight-% to ≤40 weight-%.

The composition according to the invention can be formulated as a 2-component (2K) adhesive by adding a cross-linker. The cross-linker itself can be internally or externally hydrophilized or even used without hydrophilization. Preferably, in an embodiment, the composition further comprises an aliphatic isocyanate cross-linker. Examples for suitable aliphatic isocyanate cross-linkers include isocyanate-functional isocyanurates, uretdiones, allophanates, iminooxadiazinediones, urethanes and urea of pentamethylene diisocyanate (PDI), hexamethylene diisocyanate (HDI), isophorone diisocyanate (IPDI) and $H_{12}$-MDI as well as the aforementioned diisocyanates themselves, preferred with an isocyanate (NCO) content of the cross-linker of ≥3 weight-%, preferred ≥5 weight-% and more preferred ≥10 weight-%.

The isocyanate content of the full formulation including isocyanates is preferred ≥0.1%, more preferred ≥0.15% and most preferred ≥0.2%.

In another embodiment the composition has a viscosity, as determined by rotational viscosity according to DIN EN ISO 3219 at 23° C. and 30 rpm of ≤10000 mPa s. Preferred are viscosities from ≥10 mPa s to ≤10000 mPa s, more preferred ≥20 mPa s to ≤5000 mPa s and most preferred ≥50 mPa s to ≤3000 mPa s.

The viscosity of the formulation is advantageous for good application properties by e.g. brush, spray or roller application.

In another embodiment the polyurethane polymer has a storage modulus G', measured using a plate/plate oscillation viscosimeter according to ISO 6721-10 at 100° C. and an angular frequency of 1/s, of ≥4 kPa. Preferred are storage moduli of ≥4 kPa to ≤1000 kPa, more preferred ≥50 kPa to ≤800 kPa and most preferred ≥75 kPa to ≤600 kPa.

The storage modulus of the polyurethane polymer contributes to the adhesive properties such as tack and initial bonding strength after drying of the solvent. A too low modulus implicates a too low initial bond strength, whereas a too high modulus implicates insufficient wetting of the desired substrate and the need for a higher pressure during the bonding process which may destroy the substrates.

In another embodiment the polyurethane polymer comprises urea groups. Without wishing to be bound by theory it is assumed that the solvent/co-solvent combination of the invention can effectively break up interactions between urea groups of neighboring polymer chains, thereby dissolving the polyurethanes. Urea groups can be incorporated into the polyurethane by reaction of free NCO groups with water, followed by decarboxylation. This can occur during the production of aqueous polyurethane dispersions. Other means of creating urea groups in the polyurethane are reacting free NCO groups with diamine chain extenders, monoamine chain terminators and/or amino-functional internal hydrophilizers such as sodium 2[(2-aminoethyl) amino]ethane sulphonate (AAS salt).

The presence of urea groups in the polyurethane polymer can be detected by infrared (IR) spectroscopy. In particular, the following absorption ranges are of interest: 1680-1620 $cm^{-1}$ and 1584-1545 $cm^{-1}$.

Preferably, the polyurethane has a ratio of IR absorption in the ranges of 3040-2770 $cm^{-1}$ (asymmetric $CH_2$, $CH_3$ stretching vibration) to 1680-1620 $cm^{-1}$ of ≥1.5 to ≤4. Additionally or alternatively, the polyurethane has a ratio of IR absorption in the ranges of 3040-2770 $cm^{-1}$ to 1584-1545 $cm^{-1}$ of ≥5 to ≤10. Additionally or alternatively, the polyurethane has a ratio of IR absorption in the range of 3040-2770 $cm^{-1}$ to the sum of the IR absorption in the ranges of 1680-1620 $cm^{-1}$ and 1584-1545 $cm^{-1}$ of ≥1 to ≤3.

In another embodiment the polyurethane polymer has been isolated from an aqueous polyurethane dispersion. This has the advantage that the hydrophilization and the urea groups in the polymer are provided automatically. The isolation of the polymer can be achieved by freezing the dispersion which results in the coagulation of the polyurethane to macroscopic particles. These particles can be filtered and dried to yield the isolated polyurethane polymer.

In another embodiment the solvent is methylethyl ketone and/or acetone and the co-solvent is water, methanol, ethanol, n-propanol, n-butanol, n-pentanol, n-hexanol, ethylene glycol, propylene glycol, butylene glycol, trimethylol propane or a mixture of at least two of the aforementioned substances.

Preferred combinations are methylethyl ketone (MEK) and water as well as MEK and ethanol. For example, a mixture of MEK and ethanol in a weight ratio of ≥1:1 to ≤25:1 may be used.

Examples for other preferred combinations include MEK and 1-hexanol, MEK and 1,2-ethane diol, MEK and 1,1,1-trimethylol propane, MEK and 1,2-propane diol, MEK and 2,3-butane diol as well as MEK and water.

Preferably, the compositions containing water are within the pH range of 5-9, more preferred between 6.5-8. If necessary, suitable buffer solutions such as phosphate buffers can be used in order to adjust the pH according to the desired range.

A further aspect of the invention is a method of manufacturing an adhesive composition comprising dissolving a polyurethane polymer in a solvent and a co-solvent, wherein the polyurethane polymer is an internally and/or externally hydrophilized thermoplastic polyurethane having a mass average molecular weight Mw, as determined by gel permeation chromatography against polystyrene standards using N,N-dimethyl acetamide as the eluent, of ≥50000 g/mol (preferably ≥50000 g/mol to ≤350000 g/mol), the solvent is a polar-aprotic solvent, the co-solvent is selected from water, a primary alcohol having ≤10 carbon atoms, a vicinal diol or a mixture of at least two of the aforementioned compounds, the solvent and the co-solvent are present in such amounts that they form a homogenous solution without the formation of a second phase when combined together, the hydroxyl group content is ≥1 weight-%, based on the total weight of the composition and the polyurethane polymer content is ≥10 weight-%, based on the total weight of the composition. The composition forms a single continuous liquid phase. For details reference is made to the description of the composition according to the invention. These details apply here as well and will not be repeated in the interest of brevity.

In an embodiment the method further comprises adding an aliphatic isocyanate cross-linker. For details reference is made to the description of the composition according to the invention. These details apply here as well and will not be repeated in the interest of brevity.

In another embodiment the polyurethane polymer comprises structural units derived from an aliphatic diisocyanate and/or structural units derived from a polyester diol. For details reference is made to the description of the composition according to the invention. These details apply here as well and will not be repeated in the interest of brevity.

In another embodiment the polyurethane polymer has been isolated from an aqueous polyurethane dispersion prior to its dissolution. For details reference is made to the description of the composition according to the invention. These details apply here as well and will not be repeated in the interest of brevity.

In another embodiment the solvent is methylethyl ketone and/or acetone and the co-solvent is water, methanol, ethanol, n-propanol, n-butanol, n-pentanol, n-hexanol, ethylene glycol, propylene glycol, butylene glycol, trimethylol propane or a mixture of at least two of the aforementioned substances.

A further aspect of the invention is a method of adhering two surfaces, comprising contacting at least one surface with an adhesive composition according to the invention and joining the surfaces.

A further aspect of the invention is the use of a mixture of a solvent and a co-solvent for dissolving a thermoplastic polyurethane polymer, wherein the polyurethane polymer is an internally and/or externally hydrophilized thermoplastic polyurethane having a mass average molecular weight Mw, as determined by gel permeation chromatography against polystyrene standards using N,N-dimethyl acetamide as the eluent, of ≥50000 g/mol (preferably ≥50000 g/mol to ≤350000 g/mol), the solvent is a polar-aprotic solvent, the co-solvent is selected from water, a primary alcohol having ≤10 carbon atoms, a vicinal diol or a mixture of at least two of the aforementioned compounds such amounts that they form a homogenous mixture without the formation of a second phase when combined together at 20° C. For details reference is made to the description of the composition according to the invention. These details apply here as well and will not be repeated in the interest of brevity.

In an embodiment the solvent is methylethyl ketone and/or acetone and the co-solvent is water, methanol, ethanol, n-propanol, n-butanol, n-pentanol, n-hexanol, ethylene glycol, propylene glycol, butylene glycol, trimethylol propane or a mixture of at least two of the aforementioned substances. For details reference is made to the description of the composition according to the invention. These details apply here as well and will not be repeated in the interest of brevity.

Examples

The present invention will be further described with reference to the following examples without wishing to be limited by them.

Methods

The room temperature (RT) was 23° C. Unless noted otherwise, all percentages are weight percentages based on the total weight. Viscosities were measured as rotational viscosities according to DIN EN ISO 3219 on a Brookfield viscosimeter at 30 rpm with a LV 1 to 4 spindle depending on expected viscosity. For samples that formed gels a notional viscosity of 50000 mPas was postulated.

The storage modulus (G') was measured using a plate/plate oscillation viscosimeter according to ISO 6721-10 at 100° C. and an angular frequency of 1/s.

The mass average molecular weight Mw was determined by gel permeation chromatography (GPC) using N,N-dimethyl acetamide (DMAc) at 60° C. as eluent. Analysis was carried out on a SECurity GPC-System from PSS Polymer Service at a flow rate of 1.0 mL/min, columns PSS GRAM with an RID detector. Samples of polystyrene with known molecular mass were used for calibration.

Peel strength was measured by brushing the solvent-borne adhesive formulations onto both flat sides of a PVC test specimen of 3*20*0.3 cm dimensions (the PVC included 30% softener). The PVC test specimens were cleaned by wiping with ethyl acetate and drying at RT prior to use. Samples were heat activated by heating in an oven for 5 minutes at 65° C. followed by pressing with 4 bar pressure for 60 seconds. Subsequently the average peel strength (180° peel-test with a speed of 100 mm/min with recording the average force after the first cm was peeled) was determined immediately after pressing, which is noted as "initial peel strength". Final peel strength was determined 3 days after joining the PVC specimen using the same testing conditions.

The NCO content was determined by titration. About 2.0 g of sample without isocyanate groups (blank sample) were added to 5.0 mL of a 0.1 M dibutyl amine solution in xylene followed by the addition of 50.0 mL of acetone and 3 drops of a phenol red solution (0.1 g in 80 g of a 20% ethanol in water mixture). This solution was then titrated with a 0.1 M hydrochloric acid solution to the color change and the consumption was recorded. NCO group-containing samples were treated accordingly. The NCO content "% NCO" was calculated according to:

$$\% \text{ NCO} = 4{,}2 * M * \frac{V_{blank} - V_{sample}}{m}$$

with M being the molarity of hydrochloric acid (e.g. 0.1 mol/L), m being the sample weight (g), $V_{blank}$ being the consumption of hydrochloric acid in the blank sample in mL and $V_{sample}$ being the consumption of hydrochloric acid in the sample in mL.

Theoretical OH contents (% OH), expressed as weight-percentages, were calculated from the recipe formulation as follows:

$$\% \text{ OH of protic co solvent} = \frac{f * M_{OH}}{M_{protic\,co\,solvent}} * 100$$

Where: f=number of OH groups per molecule, $M_{OH}$=molar mass of OH (17 g/mol), $M_{protic\,co\,solvent}$=molar mass of protic co solvent (g/mol).

The calculated total OH content [%] of the total formulation equals to:

calculated OH content [%] =

$$\frac{\% \text{ OH of protic } co \text{ solvent} * \text{mass of protic co solvent}}{\text{total mass}}$$

IR spectra were measured on an Tensor II machine from Bruker with an HTSXT unit. Measurements were taken with a diamond ATR unit of the Platinum series.

The measurements were evaluated with the OPUS software version 7.5 Vertex 70/80 System at 23° C. without baseline correction. Spectra were normalized in such a way as that the maximum signal intensity between 3200 cm$^{-1}$ and 2800 cm$^{-1}$ was set to 2 ATR units.

Materials

Ethanol (denatured with 2.17% toluene), 2-butanone (MEK), 2-propanol, ethyl acetate and acetone were purchased from Azelis Deutschland GmbH. 1-hexanol and 1-dodecanol, trimethylol propane (TMP) and pentaerythritol were purchased from Sigma Aldrich Chemie GmbH. If not noted otherwise, deionized water was used for all experiments. Polymers A to D, Desmocoll 621/1 and isocyanate cross-linkers Desmodur® RFE and Desmodur® DN from Covestro Deutschland AG were used.

Desmodur® RFE was a solution of tris(p-isocyanatophenyl) thiophosphate in ethyl acetate.

Desmodur® DN was a hydrophilic aliphatic polyisocyanate based on hexamethylene diisocyanate (HDI).

Polyester polyurethane polymers:

Polymer A was an aliphatic, crystallizing polyester urethane/urea, supplied as a solid powder for adhesive applications with a glass transition temperature of the polymer (DSC, 20 K/min) of −50° C., a melting temperature of the polymer (DSC, 20 K/min) of 49° C., a storage modulus at 100° C. of 207 kPa and a Mw of 144620 g/mol. Polymer A was hydrophilized internally and externally.

Ratio of IR absorption in the ranges of 3040-2770 $cm^{-1}$ to 1680-1620 $cm^{-1}$: 3,589

Ratio of IR absorption in the ranges of 3040-2770 $cm^{-1}$ to 1584-1545 $cm^{-1}$: 7,646

Ratio of IR absorption in the ranges of 3040-2770 $cm^{-1}$ to (1680-1620 $cm^{-1}$ plus 1584-1545 $cm^{-1}$): 2,442

Polymer B was an aliphatic, crystallizing polyester urethane/urea solid powder for adhesive applications with a glass transition temperature of the polymer (DSC, 20 K/min) of −51° C., a melting temperature of the polymer (DSC, 20 K/min) of 49° C., a storage modulus at 100° C. of 77.4 kPa and a Mw of 91895 g/mol.

Polymer B was hydrophilized internally and externally.

Ratio of IR absorption in the ranges of 3040-2770 $cm^{-1}$ to 1680-1620 $cm^{-1}$: 3,791

Ratio of IR absorption in the ranges of 3040-2770 $cm^{-1}$ to 1584-1545 $cm^{-1}$: 8,560

Ratio of IR absorption in the ranges of 3040-2770 $cm^{-1}$ to (1680-1620 $cm^{-1}$ plus 1584-1545 $cm^{-1}$): 2,627

Polymer C was an aliphatic, crystallizing polyester urethane/urea, supplied as solid powder for adhesive applications with a glass transition temperature of the polymer (DSC, 20 K/min) of −51° C., a melting temperature of the polymer (DSC, 20 K/min) of 49° C., a storage modulus at 100° C. of 4.18 kPa and a Mw of 62534 g/mol. Polymer C was hydrophilized internally and externally.

Ratio of IR absorption in the ranges of 3040-2770 $cm^{-1}$ to 1680-1620 $cm^{-1}$: 3,593

Ratio of IR absorption in the ranges of 3040-2770 $cm^{-1}$ to 1584-1545 $cm^{-1}$: 7,680

Ratio of IR absorption in the ranges of 3040-2770 $cm^{-1}$ to (1680-1620 $cm^{-1}$ plus 1584-1545 $cm^{-1}$): 2,448

Polymer D was an aliphatic, crystallizing polyester urethane/urea solid powder for adhesive applications with a glass transition temperature of the polymer (DSC, 20 K/min) of −51° C., a melting temperature of the polymer (DSC, 20 K/min) of 49° C., a storage modulus at 100° C. of 503 kPa and a Mw of about 341210 g/mol. Polymer D was hydrophilized internally and externally.

Ratio of IR absorption in the ranges of 3040-2770 $cm^{-1}$ to 1680-1620 $cm^{-1}$: 3,055

Ratio of IR absorption in the ranges of 3040-2770 $cm^{-1}$ to 1584-1545 $cm^{-1}$: 6,821

Ratio of IR absorption in the ranges of 3040-2770 $cm^{-1}$ to (1680-1620 $cm^{-1}$ plus 1584-1545 $cm^{-1}$): 2,110

Polymer E was an aromatic, crystallizing polyester urethane/urea, Desmocoll 621/1 supplied as solid pellets from Covestro Deutschland AG for adhesive applications with a storage modulus at 100° C. of 243 kPa.

Ratio of IR absorption in the ranges of 3040-2770 $cm^{-1}$ to 1680-1620 $cm^{-1}$: 3,096

Ratio of IR absorption in the ranges of 3040-2770 $cm^{-1}$ to 1584-1545 $cm^{-1}$: 13,086

Ratio of IR absorption in the ranges of 3040-2770 $cm^{-1}$ to (1680-1620 $cm^{-1}$ plus 1584-1545 $cm^{-1}$): 4,055

The polymers A to D were linear polymers having terminal hydroxyl groups produced by reaction of a) polyester diols and b) diol chain extenders with c) aliphatic diisocyanates. The component a) comprised a polyester diol in the molecular weight range of 1500 to 3000 g/mol, the component b) 1,4-dihydroxybutane and the component c) IPDI and HDI, forming an aqueous dispersion.

The polymer E was a linear polyester polyurethane produced from toluene solution without internal or external emulsifiers which is available under the name Desmocoll 621/1 from Covestro Deutschland AG. This polymer was used for comparative examples.

In order to obtain the described solid polymer powder of Polymers A to D, the dispersions were precipitated either by coagulation or freezing/thawing and subsequent drying at 30° C. in a hot air oven until water content was <0.5%. This yielded a solid material as coarse to fine crumbs.

Solvent compositions were prepared according to table 1. In all of the tables, examples according to the invention are denoted with an asterisk (*).

Solvent-borne 1K adhesive formulations were prepared in 500 mL glass screw-top bottles by adding the solid polymer into the desired solvent mixture and stirring with a magnetic stirrer until fully dissolved.

2K formulations were prepared by adding 10 weight-% (based on polymer content) of Desmodur® DN as aliphatic or Desmodur® RFE as aromatic isocyanate-based crosslinker available from Covestro Deutschland AG followed by stirring until fully homogenized.

Experimental results are summarized in the following tables 1 to 5.

Table 1 shows the dependence of the solubility and resulting viscosity on the nature of protic co-solvents. Experiments are normalized according to their total OH content. The following dependencies could be shown: Primary OH groups have the strongest impact on the solubilization, given that the alcohol is sufficiently soluble in the chosen solvent (see experiment no. 7-pentaerythritol was not soluble in MEK). Secondary OH groups depict a weaker impact on solubilization so cannot be used alone for the preparation of high molecular weight solvent borne adhesives. The addition of solid alcohols like TMP (given their solubility in selected solvent e.g. MEK) yields in clear, low viscous formulations with a good brushability. Therefore, experiments 1, 2, 3, 5, 6, 9 and 10 are inventive examples. Examples 4, 7 and 8 are non-inventive, as not a useful solution for coatings and adhesive applications but only a gel was formed.

Table 2 depicts the relation of solubility on the ratio of binary solvent mixtures. Whereas the protic co-solvent itself does not dissolve the polymer, ketones and most preferably MEK were found to be the best solvents for the described polymers, yet depending on their molecular weight, polymer concentrations exceeding 10 wt % formed insoluble gels with a bad brushability (compare Exp. 11). The addition of an inventive amount of protic co-solvents surprisingly leads to a significant increase in solubility of the inventive polyester polyurethanes forming low viscous liquids (Exp. 2, 12, 15, 16). Further experiments 13 and 14 showed that there are maximum values of protic co-solvents that will form insoluble mixtures.

Table 3 shows the dissolving of polymer A to E in solutions of pure MEK versus MEK/Ethanol mixtures. It can be clearly seen that the viscosity was significantly decreased by the addition of small amounts of ethanol as the protic co-solvent (Examples 19, 21, 23, 27). Polymers of very high molecular weight (polymer A to D) which formed an insoluble gel in MEK were dissolved by the binary mixtures.

Furthermore, the time needed to fully dissolve the polymers could be reduced considerably. The achievable viscosity reduction factor is in the range of >>1.5 in comparison to Polymer E which did not show any viscosity reduction (Example 25).

In table 4, experiments 28 to 30 show a pot life of >48 h exceeding industry standard of 6-24 h with a good brushability and are therefore inventive. Example 31 shows very short pot life with bad brushability.

Table 5 shows that the obtained solutions work as adhesive formulations with a targeted final peel strength of >10 N/mm. The presence of a protic co-solvent in the formulation had no visible impact on the adhesive character of the high molecular weight polyester polyurethane adhesive.

TABLE 1

| No. | 1* | 2* | 3* | 4 | 5* | 6* | 7 | 8 | 9* | 10* |
|---|---|---|---|---|---|---|---|---|---|---|
| Polymer A | 15.00 | 15.00 | 15.00 | 15.00 | 15.00 | 15.00 | 15.00 | 15.00 | 15.00 | 15.00 |
| MEK | 83.03 | 80.00 | 73.91 | 64.78 | 81.63 | 80.15 | 81.30 | 78.48 | 80.87 | 80.11 |
| Water | 1.97 | | | | | | | | | |
| Ethanol | | 5.00 | | | | | | | | |
| 1-Hexanol | | | 11.09 | | | | | | | |
| 1-Dodecanol | | | | 20.22 | | | | | | |
| 1,2-Ethane diol | | | | | 3.37 | | | | | |
| 1,1,1-Trimethylol propane | | | | | | 4.85 | | | | |
| Pentaerythritol | | | | | | | 3.70 | | | |
| 2-Propanol | | | | | | | | 6.52 | | |
| 1,2-Propane diol | | | | | | | | | 4.13 | |
| 2,3-Butane diol | | | | | | | | | | 4.89 |
| Calculated total OH content [%] | 1.85 | 1.85 | 1.85 | 1.85 | 1.85 | 1.85 | 1.85 | 1.85 | 1.85 | 1.85 |
| Calculated OH of protic co-solvent [%] | 94 | 37 | 17 | 9 | 55 | 38 | 50 | 38 | 45 | 38 |
| Result | clear, low viscosity | clear, low viscosity | clear, medium viscosity | gel | clear, low viscosity | clear, low viscosity | milky, gel | gel | clear, low viscosity | clear, low viscosity |
| Brushability | good | good | good | bad | good | good | bad | bad | good | good |
| Time until dissolved [h] | <2 | <2 | <5 | >24 | <5 | <2 | >24 | >24 | <2 | <2 |
| Viscosity [mPa s] | 240 | 380 | 1208 | n/a | 222 | 359 | n/a | n/a | 245 | 538 |

TABLE 2

| No. | 11 | 12* | 13 | 14 | 15* | 16* |
|---|---|---|---|---|---|---|
| Polymer A | 15 | 15 | 15 | 15 | 15 | 15 |
| MEK | 85 | 42.5 | 25 | | 80 | 75 |
| Ethanol | | 42.5 | 60 | 85 | | |
| Water | | | | | 5 | 10 |
| Result | gel | clear, low viscosity | insoluble | insoluble | clear, low viscosity | clear, low viscosity |
| Viscosity [mPa s] | n/a | 104 | n/a | n/a | 130 | 103 |

TABLE 3

| No. | 18 | 19* | 20 | 21* | 22 | 23* | 24 | 25 | 26 | 27* |
|---|---|---|---|---|---|---|---|---|---|---|
| Polymer A | 15 | 15 | | | | | | | | |
| Polymer B | | | 23 | 23 | | | | | | |
| Polymer C | | | | | | | | | 40 | 40 |
| Polymer D | | | | | 15 | 15 | | | | |
| Polymer E | | | | | | | 15 | 15 | | |
| MEK | | 85 | | 77 | | 85 | | 85 | | 60 |
| MEK/Ethanol (16/1 w/w) | 85 | | 77 | | 85ᵃ | | 85 | | 60 | |
| Viscosity [mPa s] | (gel) | 380 | (gel) | 1536 | (gel) | 940 | 1120 | 1112 | 30000 | 9780 |
| Viscosity reduction factor | — | >>1.5 | — | >>1.5 | — | >>1.5 | — | >>1.5 | — | >3 |

TABLE 4

| No. | 28* | 29* | 30* | 31 |
|---|---|---|---|---|
| Polymer A | | | 15 | 15 |
| Polymer B | 15 | 15 | | |
| MEK | 80 | 82 | 80 | 77 |
| Ethanol | 5 | | | |
| Water | | 3 | 5 | 5 |
| Desmodur DN | 1.5 | 1.5 | 1.5 | |
| Desmodur RFE (27% in ethyl acetate) | | | | 4.5 |
| Result | clear, low viscosity | clear, low viscosity | clear, low viscosity | yellow, viscous |
| Brushability | Good | Good | Good | Bad |
| Initial NCO content [%] | 0.33 | 0.33 | 0.33 | 0.33 |
| NCO content after 48 h [%] | 0.23 | 0.27 | 0.18 | 0.00 |
| Relative NCO content after 48 h [%] | 70 | 82 | 55 | 0 |
| Pot life | >48 h | >48 h | >48 h | <1 h |

TABLE 5

| No. | 32 | 33* |
|---|---|---|
| Polymer B | 15 | 15 |
| MEK | 85 | 80 |
| Water | | 5 |
| Peel strength initial [N/mm] | 0.5 | 0.5 |
| Peel strength final [N/mm] | >10 | >10 |

The invention claimed is:

1. An adhesive composition comprising a polyurethane polymer, a solvent and a co-solvent,
wherein
the polyurethane polymer is an internally and/or externally hydrophilized thermoplastic polyurethane having a mass average molecular weight Mw, as determined by gel permeation chromatography against polystyrene standards using N,N-dimethyl acetamide as eluent, of ≥50000 g/mol,
the solvent is a polar-aprotic solvent,
the co-solvent is selected from water, a primary alcohol having ≤10 carbon atoms, a vicinal diol or a mixture thereof,
the solvent and the co-solvent are present in such amounts that they form a homogenous mixture without formation of a second phase when combined together at 20° C.,
a hydroxyl group content is ≥1 weight-%, based on total weight of the composition,
a polyurethane polymer content is ≥10 weight-%, based on the total weight of the composition and
the composition forms a single continuous liquid phase.

2. The composition according to claim 1, further comprising an aliphatic isocyanate cross-linker.

3. The composition according to claim 1, having a viscosity, as determined by rotational viscosity according to DIN EN ISO 3219 at 23° C. and 30 rpm, of ≤10000 mPa s.

4. The composition according to claim 1, wherein the polyurethane polymer has a storage modulus G', measured using a plate/plate oscillation viscosimeter according to ISO 6721-10 at 100° C. and an angular frequency of 1/s, of ≥4 kPa.

5. The composition according to claim 1, wherein the polyurethane polymer comprises urea groups.

6. The composition according to claim 1, wherein the polyurethane polymer has been isolated from an aqueous polyurethane dispersion.

7. The composition according to claim 1, wherein the solvent is methylethyl ketone and/or acetone and the co-solvent is water, methanol, ethanol, n-propanol, n-butanol, n-pentanol, n-hexanol, ethylene glycol, propylene glycol, butylene glycol, trimethylol propane or a mixture thereof.

8. A method of manufacturing an adhesive composition comprising dissolving a polyurethane polymer in a solvent and a co-solvent,
wherein
the polyurethane polymer is an internally and/or externally hydrophilized thermoplastic polyurethane having a mass average molecular weight Mw, as determined by gel permeation chromatography against polystyrene standards using N,N-dimethyl acetamide as eluent, of ≥50000 g/mol,
the solvent is a polar-aprotic solvent,
the co-solvent is selected from water, a primary alcohol having ≤10 carbon atoms, a vicinal diol or a mixture thereof,
the solvent and the co-solvent are present in such amounts that they form a homogenous mixture without formation of a second phase when combined together at 20° C.,
a hydroxyl group content is ≥1 weight-%, based on total weight of the composition,
a polyurethane polymer content is ≥10 weight-%, based on the total weight of the composition and
the composition forms a single continuous liquid phase.

9. The method according to claim 8, further comprising adding an aliphatic isocyanate cross-linker.

10. The method according to claim 8, wherein the polyurethane polymer comprises urea groups.

11. The method according to claim 8, wherein the polyurethane polymer has been isolated from an aqueous polyurethane dispersion prior to its dissolution.

12. The method according to claim 8, wherein the solvent is methylethyl ketone and/or acetone and the co-solvent is water, methanol, ethanol, n-propanol, n-butanol, n-pentanol, n-hexanol, ethylene glycol, propylene glycol, butylene glycol, trimethylol propane or a mixture thereof.

13. A method of adhering two surfaces, comprising:
contacting at least one surface of the two surfaces with an adhesive composition according to claim 1 and
joining the two surfaces.

* * * * *